United States Patent Office 2,940,826
Patented June 14, 1960

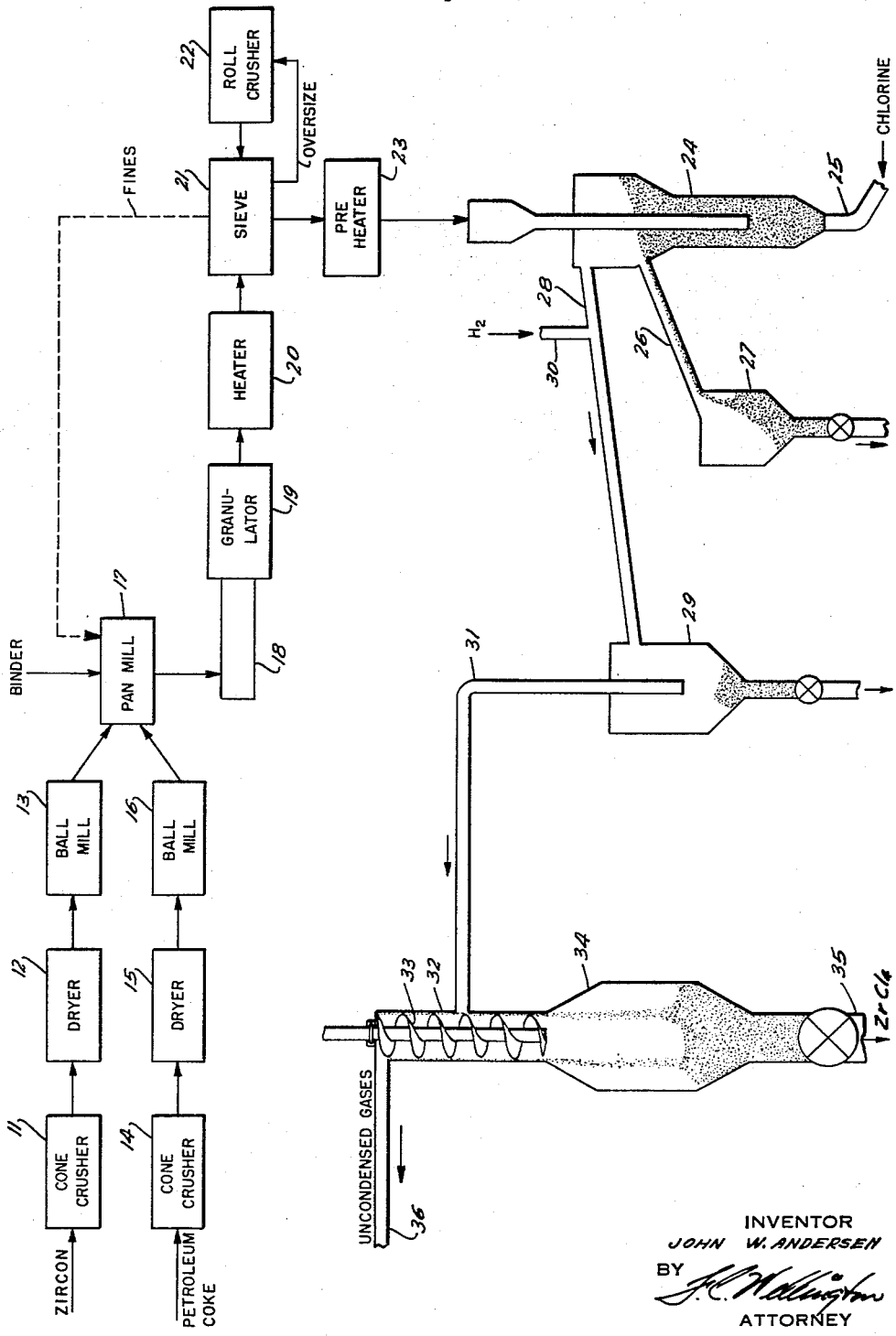

2,940,826

ZIRCONIUM TETRACHLORIDE PRODUCTION

John W. Andersen, Dayton, Ohio, assignor to Monsanto Chemical Company, St. Louis, Mo., a corporation of Delaware Filed Sept. 12, 1957, Ser. No. 683,619

5 Claims. (Cl. 23—87)

This invention relates to a process for producing zirconium tetrachloride. More specifically, it relates to a process for producing zirconium tetrachloride by the chlorination of finely divided solid zirconium-bearing materials in fluidized beds.

The formation of zirconium tetrachloride by the reaction of a gaseous chlorinating agent with a mixture of solid zirconium oxide-bearing materials and carbon has been carried out in the past. However, the utilization of this reaction in a large scale continuous production process has posed many technical difficulties which, prior to the present invention, have not been satisfactorily overcome.

The fluidized bed chlorination of simple mechanical mixtures of finely ground zirconium oxide and carbon can be carried out to some extent, but there are various problems associated with this technique which make it very difficult to carry out successfully. For example, unless the solids are very finely ground in order to expose large surface areas thereof, the rate of chemical reaction is very slow and the zirconium extraction efficiency is poor. On the other hand, when the solids are very finely ground there is a strong tendency for the solid feed materials, as well as the resulting ash, to be carried out of the reactor with the overhead gases. Also, with very small fluidized solid particles there is a marked tendency for the solids to stick to the reactor walls, lump together in the reactor bed and contribute generally to difficulties in maintaining the solid bed in a uniform state of fluidization. The foregoing difficulties, as well as numerous others, are overcome by the present process as described hereinbelow.

According to the present invention a fluidized chlorination of zirconium oxide-bearing materials can be very readily carried out by chlorinating at an elevated temperature a solid mixture of zirconium oxide and carbon, said oxide and said carbon being very finely ground and agglomerated into a particulate granular mass with a binding agent which will not decompose at the elevated chlorination temperatures.

The present process is applicable to numerous different forms of zirconium oxide and varieties of ores containing zirconium. For example, one suitable source of zirconium is zirconium dioxide, which occurs naturally in such minerals as baddeleyite. Another highly suitable source of zirconium is zircon (a zirconium silicate which can be represented as $ZrO_2 \cdot SiO_2$), which occurs naturally in various pegmatites. Other common sources of zirconium are zirconiferous beach sands or concentrates thereof, such as the tailings remaining after the recovery of titanium dioxide from ilmenite, rutile, monazite and similar titaniferous minerals. From the foregoing it will be readily recognized that the term "zirconium oxide" as used herein refers to any of the foregoing or similar ores and concentrates from which zirconium can be recovered by chlorination in the presence of a carbonaceous reducing agent.

In practicing the present invention the zirconium oxide is finely ground (for example, to about 80% minus 200 mesh, and preferably 80% minus 325 mesh) and intimately mixed with a carbonaceous reducing agent which has also been finely ground (for example, to about 80% minus 140 mesh, preferably 80% minus 200 mesh). Preferred examples of carbonaceous reducing agents are channel black and petroleum coke, but less pure forms of carbon such as ordinary coke, hard coal, charcoal, etc. can be utilized with good results under many circumstances. The quantity of carbon used in the mixture with zirconium oxide must be at least the stoichiometric amount required to convert all of the oxygen in the zirconium oxide-bearing source to the particular ratio of carbon monoxide and carbon dioxide which will be produced under the conditions at which the chlorination reaction is to be carried out. The mixture of carbon monoxide and carbon dioxide produced during the chlorination will generally be in the neighborhood of 1 mole of carbon monoxide to 4 moles of carbon dioxide, which is just about the reverse of what would have been predicted from thermodynamic considerations. Consequently it is recommended that the amount of carbon used in the mixture with zirconium oxide be at least the amount stoichiometrically required to convert all of the oxygen in the zirconium-bearing material to carbon monoxide, and preferably 1.5 times that amount.

The foregoing finely ground solids are intimately intermixed with a binding agent (generally utilized as an aqueous solution) and the resulting mixture is granulated—as for example, by passing through a granulating screen. Suitable binding agents for forming the aforesaid granules are any such agents which will not allow substantial disintegration of the granules at the temperatures at which they are chlorinated. Because such temperatures are relatively high (for example, 700° C. and higher) suitable binding agents will generally fall within the class of glassy, inorganic, high melting point materials. Examples of particularly suitable binding agents are various alkali metal silicates, and especially the di- and tetra silicates or mixtures thereof; various inorganic phosphates such as sodium, potassium, aluminum, etc. and other metal ortho, meta, pyro, and polyphosphates; hydroxides, such as sodium and potassium hydroxides; and numerous others. The concentration of the binding agent utilized (based upon total dry weight of solids in the agglomerated granules) will generally fall between about 5 or 6% and about 12 or 15% by weight.

The foregoing granulating procedure should be designed and controlled so as to produce a granulated solid feed having particle sizes falling between 8 and 200 mesh (U.S. Standard sieve sizes). The particle size distribution of the bulk granular feed should generally be such that 70 weight percent of said granules will be between 18 and 140 mesh, and preferably such that 80 weight percent thereof will be between 20 and 100 mesh.

The above-described granulated solids are then fluidized in any upwardly flowing stream of chlorinating gas in accordance with well-known principles of fluidization technology. The chlorinating gas is preferably elemental chlorine, or mixtures of chlorine with other non-chlorinating gases such as carbon monoxide, carbon dioxide, nitrogen, etc. in which the chlorine comprises an appreciable concentration (for example, greater than 25 mole percent and preferably greater than 50 mole percent). Other chlorinating gases such as phosgene, carbon tetrachloride, hydrogen chloride, etc. are also useful, especially when used in conjunction with chlorine. In order for the chlorinating gases to maintain the aforesaid granular solids in a satisfactory state of fluidization, the gases will generally be passed upwardly through the bed of solids at a superficial velocity ranging between about 0.5 and about 1.0 foot per second.

Reaction between the granular solids and chlorinating gases will proceed readily at elevated temperatures, for example, temperatures between about 700° C. and about 1000° C. and preferably between about 800° C. and about 900° C. In order to make the process thermally self-sustaining (taking into account the rates of reaction as well as normal heat losses from commercially feasible reactors) it will generally be desirable to preheat one or both of the reactant materials (i.e., the solid granular feed and/or the chlorinating gas)—the degree of preheating depending at least in part upon the particular source of zirconium being chlorinated. For example, utilizing relatively pure zircon as a raw material, the reactant feeds will preferably be preheated to approximately the same temperature as the reaction temperature; when using zirconia, somewhat lower (e.g. 100° C. to 150° C. lower) reactant preheating temperatures can be utilized.

Further details of operation for the process of the present invention can be obtained from the following description and accompanying drawing which set forth a specific embodiment illustrating the best mode contemplated for carrying out the invention.

*Example*

A relatively pure zircon concentrate (analyzing $ZrO_2$, 64 wt. percent; $HfO_2$, 1.0 wt. percent; $SiO_2$, 31.5 wt. percent; $TiO_2$, $Cr_2O_3$, monazite, etc., 3.5 wt. percent) is crushed in a cone crusher 11, dried in a dryer 12, and milled in a continuous ball mill 13 (including a closed circuit air classifier) to give a ground product of which 100% will pass a 140 mesh screen, 98 weight percent will pass a 200 mesh screen, and 87% will pass a 325 mesh screen. Likewise, petroleum coke is crushed in cone crusher 14, dried in dryer 15, and milled in ball mill 16 to give a product of which 100% will pass a 140 mesh screen, 98% will pass a 200 mesh screen, and 69% will pass a 325 mesh screen.

Seventy-nine and six-tenths parts by weight of the zircon, 12.4 parts by weight of the petroleum coke, and 21.2 parts by weight of an aqueous sodium silicate solution (containing 8 parts by weight of sodium silicate, $SiO_2/Na_2O=3.22$) are all mulled together in an edge-runner pan mill 17 until (about one hour) a moist easily-packed mixture is formed. This moist mixture is continuously fed through a screw conveyor 18 to a granulator 19 fitted with a 20 mesh granulating screen. The resulting granules are passed under an infrared radiation heater 20 and heated to a temperature between about 200° and about 300° C. to reduce the water content of the granules to below 0.5 weight percent. The dried granules are cooled to about 100° C. and fed to a 2-decked sieve 21 upon which they are separated into three different size fractions: (1) particles which do not pass through a 16 mesh screen; (2) particles which pass through a 16 mesh screen but which do not pass through a 100 mesh screen; and (3) particles which pass through a 100 mesh screen. The over-size material is passed to a coarse roll crusher 22 (roll setting of about 0.025") and recycled to the 2-decked sieve. The minus 100 mesh material is either discarded or recycled to the edge-runner pan mill 17. (If the fines are recycled to the pan mill, a proportionately larger amount of silicate binder solution must also be added into the pan mill.)

The resulting granulated solid feed (having a particle size distribution such that 100% pass through a 16 mesh screen, 95 weight percent pass through a 20 mesh screen, 75 weight percent pass through a 35 mesh screen, and only 0.5 weight percent pass through a 140 mesh screen) is placed in a preheater 23 from which it is continuously introduced into a fluidized bed reactor 24. In the preheater the solids are heated to a temperature of about 850° C. The fluidized bed is also maintained at about 850° C. Chlorine gas, also preheated to about 850° C., is introduced through line 25 and passes upwardly through the fluidized bed reactor. The fluidized bed is maintained with a depth of about 9 feet. About 80 pounds of chlorine is introduced per 100 pounds of solid feed introduced. The coarse spent (extracted) solids are allowed to overflow through line 26 into the coarse ash collector 27. The off-gases from the fluidized reactor are withdrawn overhead through line 28 and led into the cyclone separator 29. These gases contain (in addition to $ZrCl_4$, $SiCl_4$, $TiCl_4$, $Cl_2$, HCl, $CO_2$, and CO) small amounts of $FeCl_3$ and suspended particles of solid feed and fine ash. In order to prevent the $FeCl_3$ from condensing with and contaminating the $ZrCl_4$, gaseous hydrogen is introduced through line 30 to convert the $FeCl_3$ to $FeCl_2$. The cyclone separator is maintained at a temperature of about 400° C. in order to condense the $FeCl_2$ without precipitating $ZrCl_4$. The remaining gases, substantially free of condensed solids, are withdrawn from the cyclone separator through line 31 and introduced into the scraped condenser 32 which is maintained at a temperature of about 200° C. in order to precipitate $ZrCl_4$ without condensing $TiCl_4$, $SiCl_4$, etc. The condensed $ZrCl_4$ is scraped from the condenser walls by rotating screw 33 and falls into the retention bin 34 from which it is removed through line 35. The remaining uncondensed gases are withdrawn overhead through line 36. These gases can be further processed to recover $TiCl_4$, $SiCl_4$, unreacted $Cl_2$, etc.

In my co-pending application Serial No. 454,778, filed September 8, 1954, there is disclosed and claimed a method for producing titanium tetrachloride by a process somewhat related to the process of this invention.

What is claimed is:
1. A method for continuous, steady-state production of zirconium tetrachloride by the chlorination of solid bonded agglomerates of: finely divided zirconium oxide-bearing material of which at least 80% will pass a 200-mesh screen, and finely divided solid carbonaceous reducing agent of which at least 80% will pass a 140-mesh screen, the amount of carbonaceous reducing agent in said agglomerates being stoichiometrically sufficient to convert all of the oxygen in said zirconium oxide-bearing material to the carbon monoxide/carbon dioxide mixture produced under the existing chlorination conditions, said finely divided zirconium oxide-bearing material and said finely divided carbonaceous reducing agent being bonded together with an inorganic chemical binder of sufficient strength to prevent substantial physical degradation of the agglomerates during chlorination thereof, said agglomerates having particle sizes between 8 and 200 mesh, which method comprises continuously contacting gaseous chlorine and the aforesaid agglomerates in a fluidized bed reaction zone maintained at a temperature between about 700° C. and about 1000° C., the upward velocity of the gas being sufficient to maintain said solids in a turbulent fluidized state.

2. The method of claim 1 in which the reaction zone temperature is maintained between about 800° C. and about 900° C.

3. The method of claim 1 in which the reaction zone temperature is maintained between about 800° C. and about 900° C., and the particle size distribution of the solid agglomerates is such that at least 70 weight percent thereof are between 18 and 140-mesh.

4. The method of claim 1 in which the reaction zone temperature is maintained between about 800° C. and about 900° C., and the particle size distribution of the solid agglomerates is such that at least 80 weight percent thereof are between 20 and 100-mesh.

5. The method of claim 1 in which the inorganic chemical binder is a member selected from the group consisting of sodium silicates and sodium hydroxide.

(References on following page)

References Cited in the file of this patent

UNITED STATES PATENTS

| | | |
|---|---|---|
| 2,608,464 | Aagaard et al. | Aug. 26, 1952 |

FOREIGN PATENTS

| | | |
|---|---|---|
| 466,705 | Great Britain | June 2, 1937 |
| 689,012 | Great Britain | Mar. 18, 1953 |
| 763,308 | Great Britain | Dec. 12, 1956 |
| 773,535 | Great Britain | Apr. 24, 1957 |
| 1,113,883 | France | Apr. 5, 1956 |
| 1,128,603 | France | Aug. 27, 1956 |

OTHER REFERENCES

McBerty: Fiat Final Report, 774, Anhydrous Chlorides Manufacture, pp. 18–20 (1946).